(12) United States Patent
Schipper et al.

(10) Patent No.: US 7,605,751 B2
(45) Date of Patent: Oct. 20, 2009

(54) GLOBAL NAVIGATION SATELLITE SYSTEM REPEATER DISRUPTION MONITORING

(75) Inventors: Brian W. Schipper, Brooklyn Park, MN (US); Christopher A. Lund, Otsego, MN (US); Lawrence C. Vallot, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 11/531,747

(22) Filed: Sep. 14, 2006

(65) Prior Publication Data

US 2008/0068260 A1 Mar. 20, 2008

(51) Int. Cl.
*G01S 1/00* (2006.01)
(52) U.S. Cl. .................................. 342/357.06
(58) Field of Classification Search ................................
342/357.01–357.17
See application file for complete search history.

(56) References Cited

U.S. PATENT DOCUMENTS 5,557,284 A * 9/1996 Hartman ................ 342/357.03
5,995,042 A 11/1999 Durboraw, III et al.
7,411,550 B2 * 8/2008 Torimoto et al. ............. 342/453
2002/0084933 A1 * 7/2002 Krasner ................. 342/357.01
2004/0042568 A1 3/2004 Rowitch

FOREIGN PATENT DOCUMENTS

WO 2006060605 6/2006

OTHER PUBLICATIONS

Roger G. Johnston,"Think GPS Cargp Tracking=High Security? Think Again", Tranport Security World, Sep. 1, 2003.*
Butsch, Felix, "A Concept for GNSS Interference Monitoring", "ION GPS '99", Sep. 1999, pp. 125-135, Published in: Nashville, TN.
European Patent Office, "European Search Report", Dec. 27, 2007, Published in: EP.

* cited by examiner

*Primary Examiner*—Thomas H Tarcza
*Assistant Examiner*—Nga X Nguyen
(74) *Attorney, Agent, or Firm*—Fogg & Powers LLC (57) ABSTRACT

A method and systems for processing Global Positioning System (GPS) signals is provided. The method includes determining if two signals or more signals with the same pseudorandom number bit sequence (PRN) are detected by a GPS receiver.

12 Claims, 6 Drawing Sheets

GLOBAL NAVIGATION SATELLITE SYSTEM REPEATER DISRUPTION MONITORING

BACKGROUND

Signals from the Global Positioning System (GPS) can be used to calculate the location of a GPS receiver. The U.S. GPS consists of 24 satellites that transmit signals all over the world. A typical method used to determine the location of a GPS receiver is to apply triangulation techniques on received GPS satellite signals. Techniques of disrupting the determination of a location of a GPS receiver have been developed. This typically has occurred due to GPS applications in military operation. These disruption techniques include blocking, jamming, and spoofing. Blocking or jamming occurs by broadcasting radio frequency (RF) energy in the area where receivers are operating. While, blocking and jamming are basic forms of disrupting the GPS signal, spoofing is a more clever and intricate method. Spoofing causes the GPS receiver to incorrectly track a satellite signal generated from somewhere other than the satellite.

One spoofing method uses an antenna to receive signals from a satellite, then filters and amplifies that signal, and rebroadcasts or repeats it. This can be done for all received GPS signals or just a portion of them. When the GPS receiver is close to the repeated signal, the GPS receiver is presented with two separate signals with the same PseudoRandom Numbers (PRN), one from the satellite and the other from the repeated signal. If the GPS receiver tracks the repeated signal, its measurements will be invalid because they will represent measurements at the repeater reception antenna plus the distance from the repeater broadcast antenna to the user GPS antenna. Essentially the spoofed GPS receiver will see measurements as if it were located at the repeater reception antenna There are other spoofer designs that do not repeat satellite signals but generate them in another fashion such that local GPS receivers might track them and thus compute erroneous position solutions. This patent will detect the spoofed GPS satellite signals for this type of spoofer for spoofed signals of GPS satellites being tracked by the GPS receiver.

For the reasons stated above and for other reasons stated below which will become apparent to those skilled in the art upon reading and understanding the present specification, there is a need in the art for a method and apparatus that detects faulty GPS signals.

SUMMARY OF INVENTION

The embodiments of the present invention provide methods and systems for a GPS receiver to determine if there are two or more satellite signals with the same PRN detected by the GPS antenna. The embodiments of the present invention will be understood by reading and studying the following specification.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is be understood that other embodiments may be utilized and that logical, mechanical and electrical changes may be made without departing form the spirit and scope of he present invention. The following detailed description is, therefore, not to be taken in a limiting sense, and the scope of the present invention is defined only by the claims and equivalents thereof.

GPS measurements are performed by time-correlating a sensed incoming digital bit sequence with a locally generated replica of the bit sequence. In GPS, the incoming digital bit sequence is a pseudorandom number bit sequence (PRN). Each GPS satellite has its own PRN. The GPS receiver generates its own bit sequence and then correlates it to the incoming PRN from the GPS satellite. The result of the correlation is a measured offset between the locally created bit sequence and the PRN from the satellite. The measured offset is also referred to as a code offset. This is used to correct the GPS receiver's estimate of how far away the GPS satellite is from the GPS receiver antenna, which then allows for the measurement of range or pseudorange from the satellite. In order to extract the bit sequence from the incoming GPS signal the receiver must know the Doppler frequency shift off nominal of the received signal. Therefore, the GPS receiver must also track the rate of the range or pseudorange change to the satellite.

An alternative to the time-domain processing is to do the calculations in the frequency domain. The correlation done in the time domain is equivalent to multiplication in the frequency domain. The magnitude of the correlation function in the frequency domain is checked at various code and frequency offsets (pseudorange error and Doppler frequency shift off nominal). Measuring the magnitude of the correlation in the frequency domain at various code and frequency offsets is called batch processing.

In embodiments of the invention a satellite's PRN is correlated with an internally generated PRN from the GPS receiver in the frequency domain. If the magnitude of the correlation creates only one peak value, then the signal will be valid. But if the magnitude of the correlation creates more than one peak value, then the signal is no longer valid. In particular, more than one peak value indicates that another signal, with the same PRN, other than the satellite signal is spoofing the GPS receiver.

It should also be noted that multiple peaks could be caused by multipath. Since multipath is also undesirable because of the errors it induces in the GPS navigation solution, the techniques discussed in this patent could also be applied to improve system accuracy in the presence of multipath.

Figure 1:
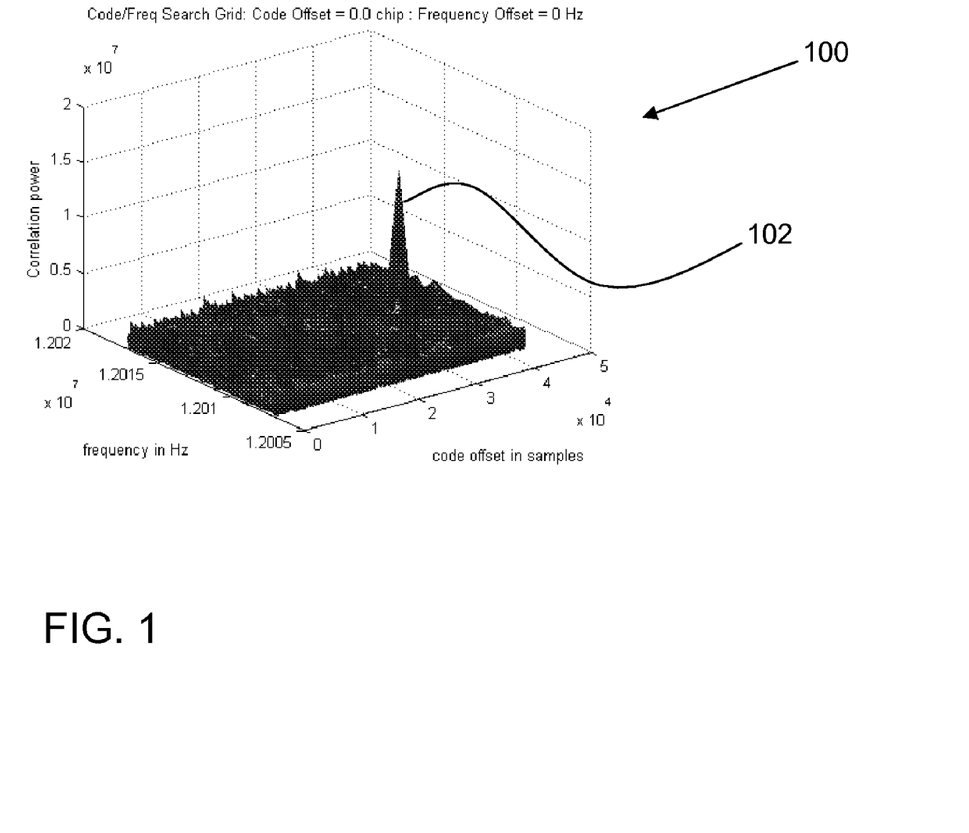
FIG. 1 is a graph illustrating a single peak value of the correlation function of one embodiment of the present invention.

FIG. 1 is a plot 100 illustrating an output of a batch processing over a range of frequency and code offsets for a particular satellite. The plot 100 is generated by the correlation, in the frequency domain, of a satellite's PRN and the internally generated PRN by the GPS receiver. The plot 100 shows a correlation peak 102. The correlation peak 102 is used to calculate the range or pseudorange from the satellite and to correct the GPS receiver's estimate of how far away the GPS satellite is from the GPS receiver antenna.

Figure 2:
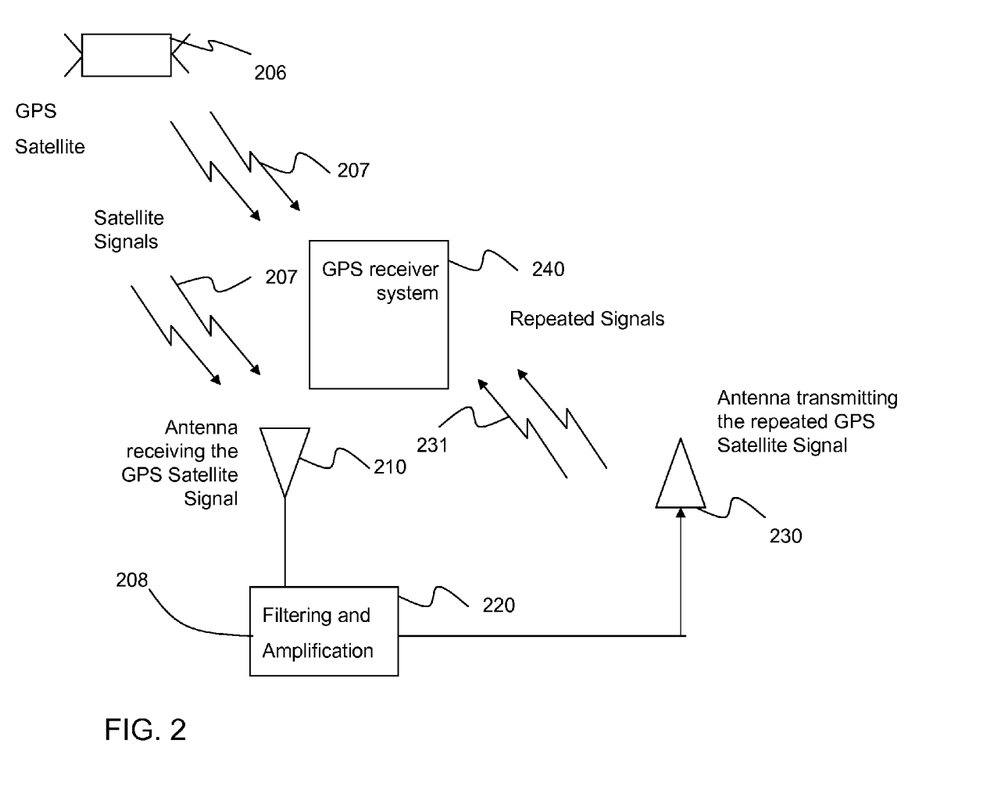
FIG. 2 is a diagram illustrating one method of spoofing a GPS receiver of one embodiment of the present invention.

FIG. 2 shows a typical spoofing system 208 and a GPS receiver 240 (or GPS receiver system 240) of one embodiment of the present invention. As illustrated, the GPS receiver 240, receives a spoofing signal 231 from the spoofing system 208 and the GPS satellite signal 207 from the GPS satellite 206. The spoofing system 208 consists of an antenna 210 receiving GPS signal from the GPS satellite 206. In the spoofing system 208, the GPS signal is then filtered and amplified 220 and fed to an antenna 230 that retransmits the GPS satellite signal. The receiving antenna 210 is electrically isolated from the transmitting antenna 230. As illustrated in FIG. 2, the GPS receiver 240 is presented with two different signals with the same PRN code—the actual satellite signal 207 from the satellite 206 and the retransmitted (repeated) satellite signal 231 from the antenna 230. If the GPS receiver 240 begins to track the repeated signal from the transmitting antenna 230, the pseudorange measurements observed for the satellite will be incorrect because they will represent the range to the repeater reception antenna plus the extra range from the repeater antenna 230 to the GPS receiver 240. Essentially the spoofed GPS receiver will see measurements as if it were located at the repeater reception antenna. Embodiments of the GPS receiver 240, of the present invention, are able to detect the presence of the repeated signal 231. The GPS receiver 240 is also referred to as a GPS signal processing system. It should be noted that the spoofer system may deliberately spoof only satellites in a certain portion of the sky such that not all satellite signals are spoofed. This will make the location of the spoofer system a bit more difficult to determine by those being spoofed.

Figure 3:
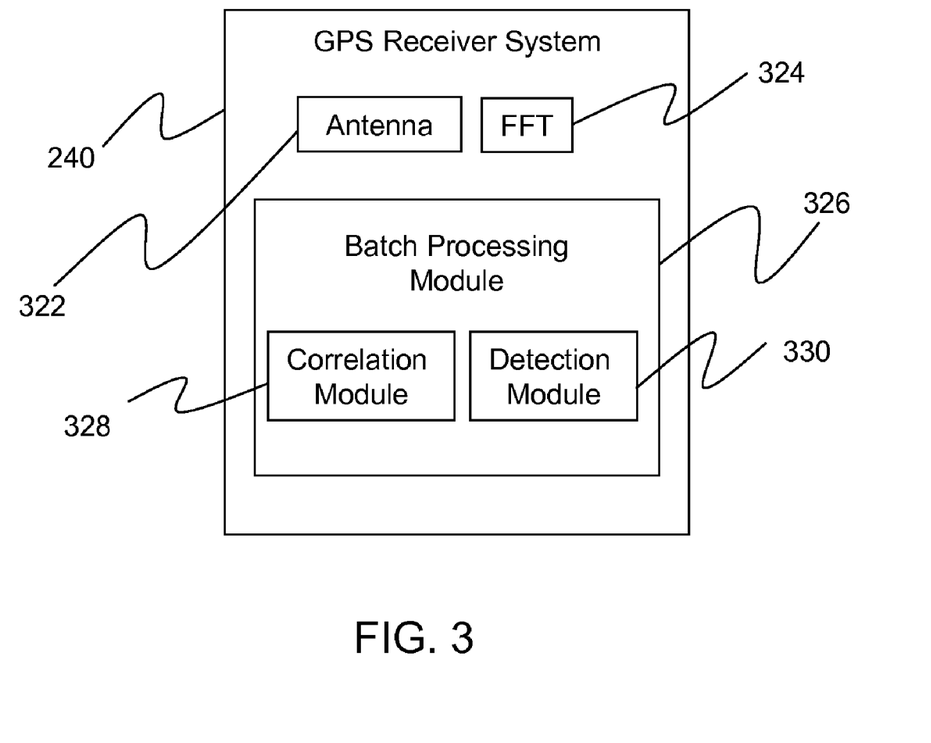
FIG. 3 is a GPS receiver system of one embodiment of the present invention.

FIG. 3 illustrates the GPS receiver 240 of FIG. 2. The GPS receiver system 240 includes antenna 322, Fast Fourier Transform FFT processing hardware 324, and batch processing module 326. The antenna 322 receives a signal from the GPS satellite, and if the device is being spoofed, it will also receive a signal from the repeated transmitted signal. The antenna 322 is in communication with the FFT processing hardware 324. The FFT processing hardware 324 converts the received signals from the antenna 322 from the time domain into the frequency domain. The FFT processing hardware 324 communicates the frequency domain data to the batch processing module 326. The batch processing consists of, but is not limited to, the correlation module 328 and the detection module 330. The correlation module 328 performs frequency correlation between the received signal(s) and internally generated PRN of the GPS receiver by multiplying the frequency domain signals and determining the peak correlation value. The detection module 330 detects the peak values from the correlation module 328. If the detection module 330 only detects one peak correlation value from the correlation module, then the GPS receiver system will track that signal. If the detection module 328 detects more than one peak correlation value from the correlation module 328, the GPS receiver will ignore the values.

Figure 4:
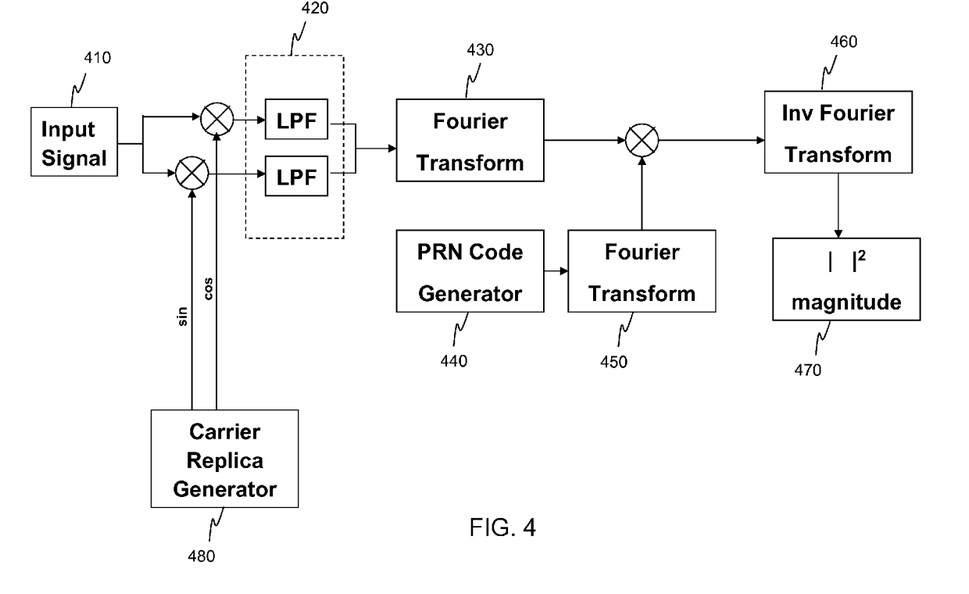
FIG. 4 is a block diagram illustrating one method of determining if two or more signals with the same PRN are present at the GPS receiver antenna of one embodiment of the present invention.

FIG. 4 is a block diagram illustrating one method for determining whether the GPS receiver is being presented with a repeated signal. The method starts with input signal 410 at the antenna of the GPS receiver. The input signal 410 consists of the satellite signal and when there is a repeated signal, the repeated signal. The input signal 410 is convolved with the carrier replica generator 480. The carrier replica is a sin wave replica at the frequency of the incoming signal. The code replica is the replica of the PRN code. GPS signal correlation involves convolution with both replicas. This is illustrated by the two convolution operations in FIG. 4. The output of the convolution of the input signal 410 with the sine and cosine of the carrier replica from the carrier replica generator 480 are filtered by a set of low pass filters 420. The filtered signals are then transformed from the time domain into the frequency domain by a Fourier transform 430 in this embodiment.

In FIG. 4, the PRN code generator 440 is also transformed into the frequency domain through a Fourier transform 450. One skilled in the art would appreciate that the filtered signals and the PRN code signal can be transformed from the time domain by other methods and this invention is not limited to the use of Fourier transforms.

In FIG. 4, the frequency domain representation of the input signal 410 convolved with the sine and cosine carrier replicas from the carrier replica generator 480 are multiplied with the frequency domain representation of the PRN code that is output from 450. The multiplied signal is then brought back into the time domain through an inverse Fourier transform 460 in this embodiment. One skilled in the art would appreciate that the signal can be transformed back into the time domain by other methods and this invention is not limited to the use of Fourier transforms. The magnitude 470 of the combined input signal 410, carrier replica generated signal 480, and PRN code 440 is calculated. This method is repeated for various frequency offsets for the carrier replica generator 480.

In the method of FIG. 4, the steps laid out above are repeated for various frequency offsets. The resulting values can be stored in a three dimensional matrix. Where the magnitude 470 is a function of the frequency offsets and the code offsets. This type of measurement where the magnitude 470 is measured by computing the code correlation while varying the frequency offset is known as batch processing. One skilled in the art will appreciate that measuring the magnitude by varying the code offset before varying the frequency offset is equivalent to the method described above. The code offset result is accomplished via the frequency domain convolution (this is illustrated in the second convolution in the block diagram of FIG. 4). The output of that operation is a magnitude function over code offset. This 2-D function is computed for various frequency offsets and assembled to form the 3-D plot.

Peak values can be calculated by simply using time-domain values, without any frequency domain conversion, but the code and frequency offsets are still varied. They can also be found by only using code offsets and no frequency offsets. And the peak value can be found by using frequency domain values and varying both code and frequency offsets. One skilled in the art, upon reading this specification, will realize how to calculate peak values using only time-domain values and using the batch processing technique. For clarification, calculating the peak values using only the time-domain values is achieved by not performing conversions from the time domain to the frequency domain, and simply correlating the input signal convolved with the sine and cosine carrier replicas from the carrier replica generator 480 and the output of the PRN code generator 440.

Figure 5:
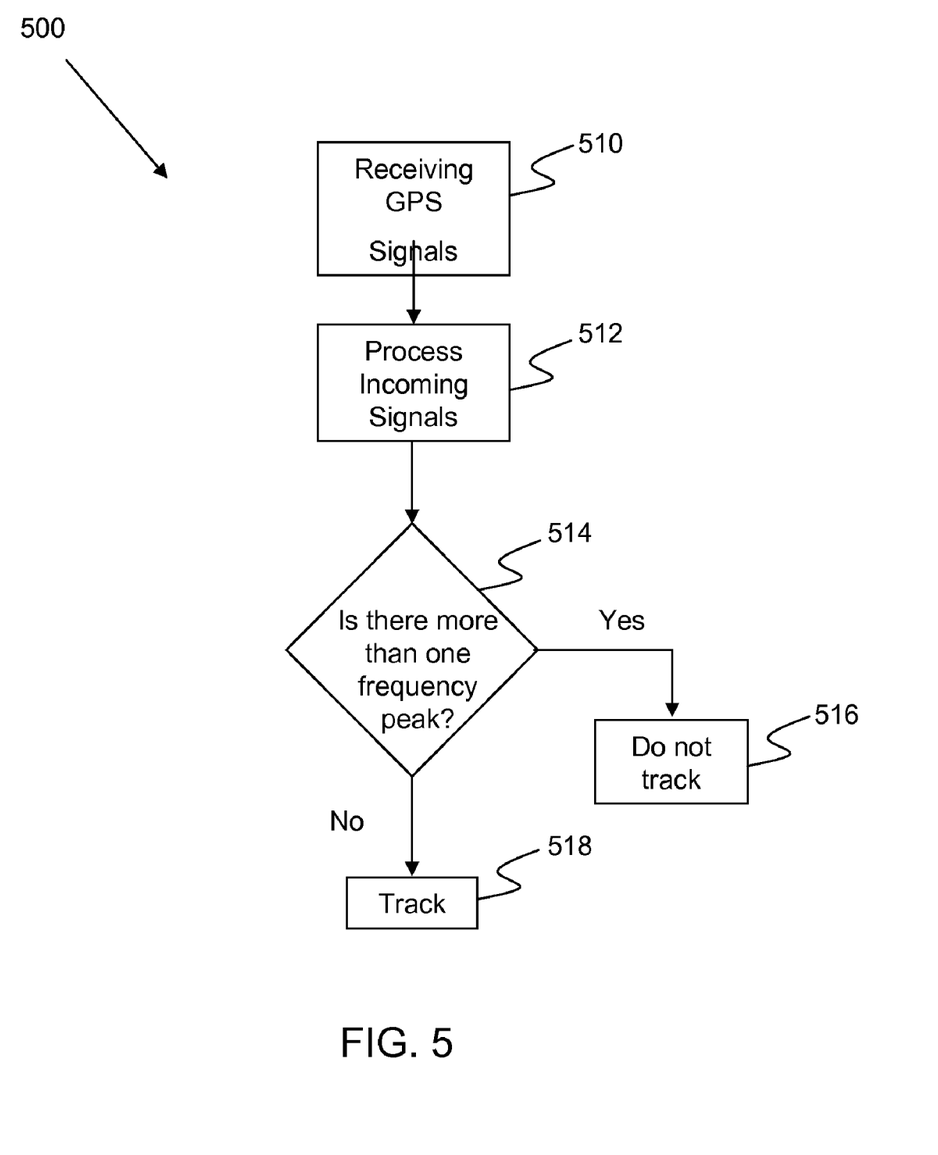
FIG. 5 is a flow chart illustrating one method of determining if two or more signals with the same PRN are present at the GPS receiver antenna of one embodiment of the present invention.
Figure 6:
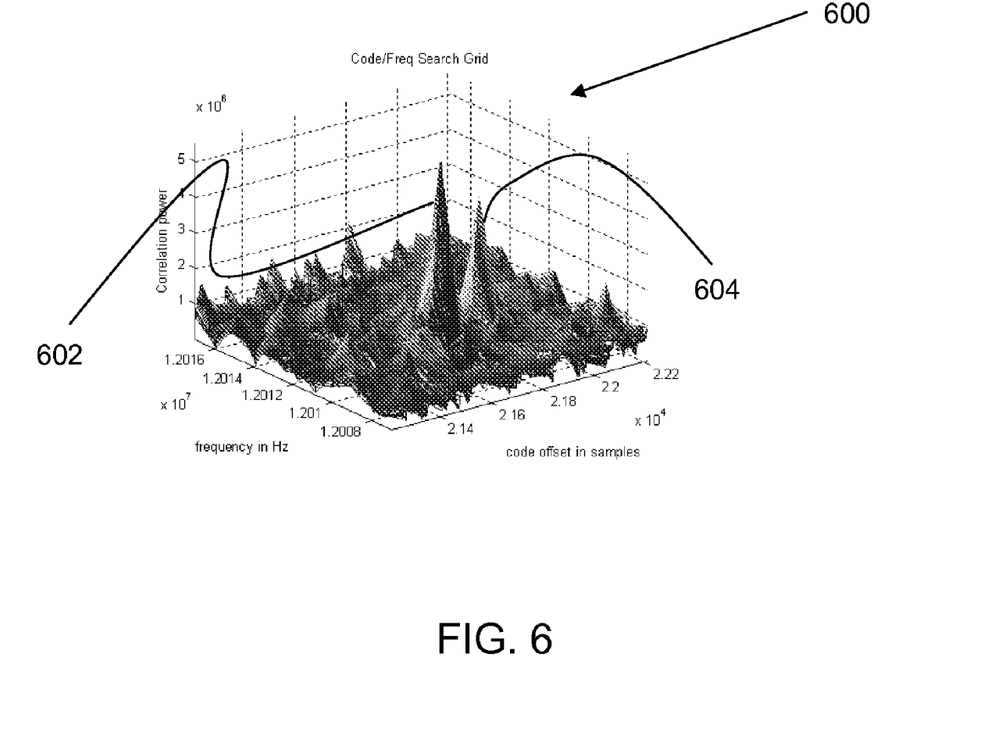
FIG. 6 is a graph illustrating two peak values of the correlation function of one embodiment of the present invention.

FIG. 5 is a flow chart 500 illustrating one method of one embodiment for finding a repeated satellite signal. In the flow chart 500, the process starts by receiving the incoming GPS signals (510). Because of spoofing one or more of these incoming GPS signals could have the same PRN code. The next step is to process the incoming signal. The incoming signal is processed at step (512), by correlating the incoming signal with the GPS receiver's internally generated PRN. In one embodiment the correlation procedure, begins by first performing a fast Fourier transform (FFT) of the time domain signal to convert the incoming signal into the frequency domain. Then secondly, in the frequency domain, correlating the PRN from the incoming signal and the internally generated PRN from the GPS receiver by multiplying the signals. When spoofing is present there will be two identical PRNs in the incoming signal being correlated, in step (512), with the internally generated PRN in the GPS receiver. When no spoofing is present there will only be one PRN in the incoming signal (from the actual satellite) being correlated, in step (512), with the internally generated PRN in the GPS receiver. If there is more than one identical PRN in the incoming signal, then the correlation in step (512) will produce two peak values over a range of frequency offsets and code offsets, as shown in FIG. 6. If there is only one PRN in the incoming signal, then the correlation in step (512) will produce one peak value, as shown in FIG. 1.

The next step in the process is to determine if there is more than one correlation peak (514). In one embodiment the correlation peak is determined by implementing software applications stored on a computer readable medium designed to detect correlation peaks. The computer-readable medium can be, but is not limited to floppy disks, hard disks, CD-ROMs, Flash ROM, nonvolatile ROM, RAM, and the like. If there is only one peak then, as shown in FIG. 1, plot 100, there is only one received signal. If there is only one received signal, then it has to come from the GPS satellite and the next step is for the GPS receiver to track that signal (518). However, if there is more than one peak, as shown in plot 600 in FIG. 6, then there are two sources of the GPS signal. FIG. 6 was generated with two different received signals from different sources being correlated in the frequency domain with the internally generated PRN in the GPS receiver. The two sources would be the satellite signal and the repeated signal (spoofed signal). If there is more than one correlation peak detected by the GPS receiver, then the next step (516) is for the GPS receiver to not track the signals. The reason to reject both signals is because the GPS receiver does not know which signal is the spoofed signal and which signal is coming from the GPS satellite.

FIG. 6 is a plot 600 illustrating an output of a batch processing over a range of frequency and code offsets for a particular satellite. Plot 600 is generated by the correlation, in the frequency domain, of a satellite's PRN, repeated satellite signal's PRN, and the internally generated PRN by the GPS receiver. The plot 600 shows two correlation peaks 602 and 604. Since there are more than two correlation peak values, the GPS receiver knows to not track the signal because it is being spoofed.

While the embodiments and examples have been limited to GPS in the specification, the scope of the embodiments are not limited merely to GPS systems. The scope of the invention covers all methods, systems, and computer-readable mediums designed to overcome signal spoofing.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

The invention claimed is:

1. A method of processing Global Positioning System (GPS) signals, the method comprising:
determining if two signals or more signals with the same pseudorandom number bit sequence (PRN) are detected by a GPS receiver; and
when two signals or more signals with the same PRN are detected, disregarding the two signals or more signals.

2. The method of claim 1, further comprising:
convolving an internally generated PRN from the GPS receiver with the broadcasted PRN from the received signals; and
taking the magnitude.

3. The method of claim 2, further comprising:
repeating over frequency offsets;
finding the peak value.

4. The method of claim 3, further comprising:
when there is one peak, tracking the detected signal.

5. The method of claim 3, further comprising:
when there is more than one peak, disregarding the detected signals.

6. The method of claim 1, further comprising:
detecting GPS signals;
converting detected signals into a frequency domain;
correlating an internally generated PRN from the GPS receiver with the broadcasted PRN from the received signals in the frequency domain by multiplication;
converting the correlated signal back into the time domain; and
taking the magnitude of the signal.

7. The method of claim 6, further comprising:
repeating over frequency offsets;
finding the peak value.

8. The method of claim 7, further comprising:
when there is one peak, tracking the detected signal.

9. The method of claim 7, further comprising:
when there is more than one peak, disregarding the detected signals.

10. A Global Positioning System (GPS) signal processing system, the system comprising:
an antenna for receiving GPS signals;
a processor adapted to converting the antenna signal from the time domain into the frequency domain; and
a correlation module adapted to correlate the incoming signal with the internally generated pseudorandom number (PRN) bit sequence over varying frequency and code offsets;
a detecting module that detects peak values from the correlation; and
a tracking function configured to indicate when more than one peak value is detected and prompt a GPS receiver to disregard signals when more than one peak correlation value is found.

11. A computer-readable medium having computer-executable instructions for performing a method comprising:
converting incoming Global Positioning System (GPS) signals into the frequency domain;
correlating the frequency domain input signal with the internally generated PRN of the GPS receiver; and
finding at least one peak value of the correlation value over a range of frequency and code offsets;
determining if more than one peak value is present; and
prompting a GPS receiver to disregard the signals if more than one peak value is found.

12. A computer-readable medium of claim 11, further comprising:
prompting a GPS receiver to track the signal if only one peak value is found.

* * * * *

UNITED STATES PATENT AND TRADEMARK OFFICE
CERTIFICATE OF CORRECTION

PATENT NO.      : 7,605,751 B2                                    Page 1 of 1
APPLICATION NO. : 11/531747
DATED           : October 20, 2009
INVENTOR(S)     : Schipper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Fifth Day of October, 2010

David J. Kappos
*Director of the United States Patent and Trademark Office*